United States Patent
Dougherty et al.

(10) Patent No.: US 9,493,718 B2
(45) Date of Patent: *Nov. 15, 2016

(54) LIQUID PHASE DISTILLATE DEWAXING

(75) Inventors: Richard C. Dougherty, Moorestown, NJ (US); Michael A. Hayes, Washington, NJ (US); Benjamin S. Umansky, Fairfax, VA (US); William E. Lewis, Baton Rouge, LA (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 119 days.

This patent is subject to a terminal disclaimer.

(21) Appl. No.: 13/168,196

(22) Filed: Jun. 24, 2011

(65) Prior Publication Data

US 2012/0004477 A1    Jan. 5, 2012

Related U.S. Application Data

(60) Provisional application No. 61/359,877, filed on Jun. 30, 2010.

(51) Int. Cl.
    *C10G 45/02*      (2006.01)
    *C10G 45/44*      (2006.01)
    (Continued)

(52) U.S. Cl.
CPC ............... *C10L 1/08* (2013.01); *C10G 45/02* (2013.01); *C10G 45/44* (2013.01); *C10G 45/64* (2013.01); *C10G 65/043* (2013.01); *C10G 65/08* (2013.01); *C10G 2300/1014* (2013.01); *C10G 2300/1018* (2013.01); *C10G 2300/1048* (2013.01); *C10G 2300/202* (2013.01); *C10G 2300/301* (2013.01);
(Continued)

(58) Field of Classification Search
USPC ......................................................... 585/240
See application file for complete search history.

(56) References Cited

U.S. PATENT DOCUMENTS 3,412,016 A    11/1968   Graven
4,549,955 A * 10/1985   Shih ............................... 208/59
(Continued)

FOREIGN PATENT DOCUMENTS

EP            202744 A2 * 11/1986
EP        0 819 752 B1    4/2001
(Continued)

OTHER PUBLICATIONS

American Petroleum Institute Petroleum HPV Testing Group, Robust Summary of Information on Heavy Fuel Oil Category, Creation Date May 23, 2003, p. 1-7.*
(Continued)

*Primary Examiner* — In Suk Bullock
*Assistant Examiner* — Philip Louie
(74) *Attorney, Agent, or Firm* — Larry E. Carter; Chad A. Guice; David M. Weisberg (57) ABSTRACT

Hydrocarbon feeds can be hydrotreated in a continuous gas-phase environment and then dewaxed in a liquid-continuous reactor. The liquid-continuous reactor can advantageously be operated in a manner that avoids the need for a hydrogen recycle loop. A contaminant gas can be added to the hydrogen input for the liquid-continuous reactor to modify the hydrogen consumption in the reactor.

20 Claims, 2 Drawing Sheets

(51) Int. Cl.
*C10G 45/64* (2006.01)
*C10L 1/08* (2006.01)
*C10G 65/04* (2006.01)
*C10G 65/08* (2006.01)

(52) U.S. Cl.
CPC . *C10G 2300/304* (2013.01); *C10G 2300/4006* (2013.01); *C10G 2300/4012* (2013.01); *C10G 2300/4018* (2013.01); *C10G 2300/4081* (2013.01); *C10G 2400/04* (2013.01); *Y02E 50/13* (2013.01); *Y02P 30/20* (2015.11)

(56) References Cited

U.S. PATENT DOCUMENTS

| | | | |
|---|---|---|---|
| 5,565,088 A * | 10/1996 | Nair et al. | 208/58 |
| 6,123,835 A | 9/2000 | Ackerson et al. | |
| 6,428,686 B1 | 8/2002 | Ackerson et al. | |
| 6,881,326 B2 | 4/2005 | Ackerson et al. | |
| 7,282,138 B2 * | 10/2007 | Ellis et al. | 208/89 |
| 7,291,257 B2 | 11/2007 | Ackerson et al. | |
| 2005/0082202 A1 | 4/2005 | Ackerson | |
| 2006/0144756 A1 * | 7/2006 | Ackerson et al. | 208/108 |
| 2008/0173570 A1 | 7/2008 | Marchand et al. | |
| 2009/0095651 A1 | 4/2009 | Leonard et al. | |
| 2009/0095653 A1 | 4/2009 | Kokayeff et al. | |
| 2009/0095655 A1 | 4/2009 | Kokayeff et al. | |
| 2009/0095656 A1 | 4/2009 | Kokayeff et al. | |
| 2009/0107033 A1 | 4/2009 | Gudde et al. | |
| 2010/0083563 A1 | 4/2010 | Miller | |
| 2010/0147747 A1 | 6/2010 | Elia et al. | |

FOREIGN PATENT DOCUMENTS

| | | |
|---|---|---|
| FR | 2931812 | 6/2008 |
| WO | 2008113492 | 9/2008 |
| WO | 2009/052025 A2 | 4/2009 |
| WO | 2010/002903 A2 | 1/2010 |
| WO | 2010053468 | 5/2010 |

OTHER PUBLICATIONS

C. Schmitz, L. Datsevitch, A. Jess, "Deep desulfurization of diesel oil: kinetic studies and process-improvement by the use of a two-phase reactor with pre-saturator", Chemical Engineering Science 59 (2004) pp. 2821-2829.

* cited by examiner

LIQUID PHASE DISTILLATE DEWAXING

CROSS-REFERENCE TO RELATED APPLICATIONS

This Application claims the benefit of U.S. Application No. 61/359,877, filed Jun. 30, 2010, the entire contents of which are hereby incorporated by reference herein.

FIELD OF THE INVENTION

The invention is related to the hydroprocessing of feeds to form a diesel fuel product.

BACKGROUND OF THE INVENTION

A variety of factors can dictate how a feedstock is used in a refinery. One consideration can be the hydrogen required to process a feedstock to a desired product. For example, if hydrotreatment of a feed will require more hydrogen than is economically available, the feed may instead be used for a process with lower hydrogen requirements, such as fluid catalytic cracking. As a result, considerations such as hydrogen consumption can limit the flexibility of a refinery to change the products generated from a given input crude oil.

U.S. Pat. Nos. 7,291,257 and 6,123,835 describe systems and methods for processing feedstocks that involve processing the feed in a reactor having a continuous liquid phase. The methods include using a diluent material as a means for supplying hydrogen necessary for a process. Various methods for adding a diluent to the feed are described, such as recycling a portion of the product. Processes performed in a continuous liquid phase reactor include hydrotreatment, hydrocracking, and hydroisomerization.

U.S. Published Patent Application No. 2009/0095653 describes a system and method for performing a hydroisomerization process. The hydroisomerization is performed in a reactor that has a substantially continuous liquid phase. An excess of hydrogen gas can be present beyond the solubility limit of the feedstock. However, the flowing medium in the reactor is described as being substantially liquid-continuous. The excess hydrogen gas is described as allowing the liquid phase to remain saturated with hydrogen as the reaction proceeds.

SUMMARY OF THE INVENTION

One aspect of the invention relates to a method for making a diesel fuel product, comprising: contacting a feedstock with a hydrotreating catalyst under effective hydrotreating conditions in a hydrotreatment reactor that includes a continuous gas phase to make a hydrotreated effluent; separating the hydrotreated effluent into at least a hydrotreated liquid product and a gas-phase product, the hydrotreated liquid product having a cloud point, the gas-phase product including $H_2$ and $H_2S$; mixing the hydrotreated liquid product with a hydrogen-containing stream and at least a portion of the gas-phase product to produce a hydrotreated dewaxing input stream, the hydrotreated dewaxing input stream having an $H_2S$ content corresponding to at least about 0.1 mol % of a total gas content in the hydrotreated dewaxing input stream; and contacting the hydrotreated dewaxing input stream with a dewaxing catalyst under effective catalytic dewaxing conditions in a liquid-continuous reactor to form a dewaxed effluent that includes a dewaxed distillate product, the dewaxed effluent having a cold flow property that is at least about 9° F. (about 5° C.) less than a corresponding cold flow property of the feedstock, the cold flow property comprising one or more of a cloud point, a pour point, and a cold filter plugging point.

Another aspect of the invention relates to a method for making a diesel fuel product, comprising: providing a feedstock having a cloud point of at least about 15° F. (about −4° C.) and having a first aromatics content; contacting the feedstock with a hydrotreating catalyst under effective hydrotreating conditions in a hydrotreatment reactor that includes a continuous gas phase to make a hydrotreated effluent; separating the hydrotreated effluent into at least a hydrotreated liquid product and a gas phase product, the gas phase product including $H_2$ and $H_2S$; mixing the hydrotreated liquid product with a hydrogen containing stream and the gas phase product to form a hydrotreated dewaxing input stream; and contacting the hydrotreated dewaxing input stream with a dewaxing catalyst under effective catalytic dewaxing conditions in a liquid-continuous reactor to form a dewaxed effluent including a dewaxed distillate product, the dewaxed effluent having a second aromatics content that is at least about 50% of the first aromatics content, and the dewaxed effluent also having a cloud point at least about 9° F. (5° C.) lower than the cloud point of the feedstock.

DETAILED DESCRIPTION OF THE EMBODIMENTS

Overview

In various embodiments, a system and method are provided for producing diesel fuel from a feedstock. Demand for diesel fuel may increase in the future, particularly relative to gasoline. In order to accommodate this anticipated additional demand, it could be beneficial to be able to produce diesel from feedstocks conventionally used for gasoline production. Waxy heavy atmospheric gas oils are one type of hydrocracking feed that could be switched from gasoline production to diesel production. Conventionally, waxy heavy atmospheric gas oils are often used cracked to produce gasoline, due to the high cloud point of the gas oil and/or to the difficulty in achieving relatively deep desulfurization of the gas oil. The nature of the sulfur in the gas oil can require relatively severe hydrotreating conditions to remove. As relatively severe conditions can more quickly deactivate other catalysts such as dewaxing catalysts, this can make it less desirable to include such catalysts in a multifunctional hydrotreatment reactor. A separate dewaxing reactor can be used, but this generally means that another large hydroprocessing vessel will be required, with potentially a correspondingly large hydrogen requirement. The nature of a catalytic dewaxing process, using highly selective hydroisomerization catalysts, can tend to result in additional aromatic saturation of a hydrotreated gas oil feed. The aromatic saturation during a dewaxing stage can, in some cases, be comparable to the aromatic saturation that occurs during a hydrotreating stage, causing a further drain on available hydrogen in a refinery.

The systems and methods according to the invention can allow for production of a diesel fuel product from a feed that requires dewaxing while reducing or minimizing the overall hydrogen requirement for the dewaxing process. This can allow heavier feeds to be converted into a diesel fuel product in a more cost effective manner. Thus, some heavier feeds that might be used conventionally for cracking into gasoline can instead be used, preferably more efficiently, to make a higher value diesel product.

The methods according to the invention can include hydrotreating a feed, such as a gas oil feed, in a hydrotreatment reactor, e.g., of the trickle-bed type. Although one reactor will be described here for convenience, it is understood that any convenient combination of one or more hydrotreatment beds, stages, and/or reactors can be used for the hydrotreatment. The effluent from the hydrotreatment reactor can then be separated, and a liquid portion of the effluent can be passed into a liquid-continuous reactor for catalytic dewaxing. Again, although one reactor will be described here for convenience, it is understood that any convenient combination of one or more beds, stages, and/or reactors is contemplated. Performing the dewaxing of the feed in a liquid-continuous reactor can reduce the hydrogen requirements for the dewaxing stage. In a trickle-bed reactor, a relatively large excess of hydrogen can be present, typically between about two and about ten times the amount stoichiometrically required for reaction. By contrast, in a liquid-continuous reactor, the amount of hydrogen present can be much lower, and is often related to the solubility limit of hydrogen (gas) in the (liquid) feed.

In addition to reducing the hydrogen required for dewaxing, the consumption of hydrogen during a dewaxing stage can also be reduced. In an embodiment, at least a portion of the gas introduced into the liquid-continuous reactor can be at least a portion of the overhead gas from the separation. In addition to hydrogen, this overhead gas can typically include hydrogen sulfide. By introducing at least a portion of hydrogen sulfide to the treat gas entering the liquid-continuous dewaxing zone, the hydrogen consumption during dewaxing can be controlled to reduce the overall consumption needed to produce a suitable diesel fuel without substantially increasing (and/or while substantially maintaining) the level of coke formation on the catalyst.

Feedstocks

A mineral hydrocarbon feedstock refers to a hydrocarbon feedstock derived from crude oil that has optionally been subjected to one or more separation and/or other refining processes. Mineral hydrocarbon feedstocks useful according to the methods of the invention can include petroleum feedstocks boiling in the diesel range or at higher temperatures. Additionally or alternatively, suitable feedstocks can include gas oils produced by the distillation of crude oil at approximately atmospheric pressure. A crude oil distillation tower can generally produce several grades of atmospheric gas oils. Other examples of mineral hydrocarbon feedstocks can include, but are not limited to, vacuum gas oils, demetallized oils, coker distillates, cat cracker distillates, jet fuel boiling range distillate fraction, kerosene boiling range distillate fraction, coal liquids, and combinations thereof.

The feedstock can have an initial boiling point of at least about 115° C., for example at least about 140° C. or at least about 170° C. Further, a feed can be characterized based on the portion of the feed that boils at a temperature and/or based on measurable properties such as cold flow properties (e.g., cloud point). For instance, a T5 boiling point can be defined as the temperature at which 5% of the feed will boil. Thus, when the feedstock is characterized based on boiling point range, the feedstock can additionally or alternately have a T5 boiling point of at least about 150° C., for example at least about 175° C. or at least about 190° C. Further additionally or alternately, the feedstock can have a final boiling point of about 455° C. or less, or about 440° C. or less, or about 425° C. or less. Still further additionally or alternately, the feedstock can have a T95 boiling point of about 440° C. or less, for example about 425° C. or less or about 400° C. or less. When the feed is characterized based on cloud point, the cloud point of the feedstock can additionally or alternately be about 50° F. (about 10° C.) or less, for example about 40° F. (about 4° C.) or less, about 25° F. (about −4° C.) or less, or about 10° F. (about −12° C.) or less. Further additionally or alternately, the cloud point of the feedstock can be at least about 5° F. (about −15° C.), for example at least about 15° F. (about −9° C.), at least about 25° F. (about −4° C.), at least about 32° F. (about 0° C.), or at least about 40° F. (about 4° C.).

The mineral feedstock can contain nitrogen-containing compounds (abbreviated as "nitrogen" or "nitrogen content") and typically also sulfur-containing compounds (abbreviated as "sulfur" or "sulfur content"). In general, at least a majority of the nitrogen can be in the form of organonitrogen compounds. Additionally or alternatively, at least a majority of the sulfur can be in the form of organosulfur compounds.

The mineral feedstreams suitable for use in various embodiments can have a nitrogen content from about 50 wppm to about 6000 wppm, preferably from about 50 wppm to about 2000 wppm, from about 50 wppm to about 1500 wppm, or from about 75 wppm to about 1000 wppm. Additionally or alternatively, mineral feedstreams suitable for use herein can have a sulfur content from about 100 wppm to about 40,000 wppm, for example from about 100 wppm to about 30,000 wppm or from about 200 wppm to about 20,000 wppm, preferably from about 200 wppm to about 10,000 wppm, from about 200 wppm to about 5000 wppm, or from about 350 wppm to about 2500 wppm sulfur.

In various embodiments of the invention, the feed can additionally or alternatively include feeds from biocomponent sources, such as vegetable, animal, fish, and/or algae. Generally, these biological materials include vegetable fats/oils, animal fats/oils, fish oils, pyrolysis oils, and algae lipids/oils, as well as components of such materials. More specifically, the lipid material includes one or more type of lipid compounds. Lipid compounds are typically biological compounds that are insoluble in water, but soluble in nonpolar (or fat) solvents. Non-limiting examples of such solvents include alcohols, ethers, chloroform, alkyl acetates, benzene, and combinations thereof.

Major classes of lipids include, but are not necessarily limited to, fatty acids, glycerol-derived lipids (including fats, oils and phospholipids), sphingosine-derived lipids (including ceramides, cerebrosides, gangliosides, and sphingomyelins), steroids and their derivatives, terpenes and their derivatives, fat-soluble vitamins, certain aromatic compounds, and long-chain alcohols and waxes.

In living organisms, lipids generally serve as the basis for cell membranes and as a form of fuel storage. Lipids can also be found conjugated with proteins or carbohydrates, such as in the form of lipoproteins and lipopolysaccharides.

Examples of vegetable oils that can be used in accordance with this invention include, but are not limited to rapeseed (canola) oil, soybean oil, coconut oil, sunflower oil, palm oil, palm kernel oil, peanut oil, linseed oil, tall oil, corn oil, castor oil, jatropha oil, jojoba oil, olive oil, flaxseed oil, camelina oil, safflower oil, babassu oil, tallow oil and rice bran oil.

Vegetable oils as referred to herein can also include processed vegetable oil material. Non-limiting examples of processed vegetable oil material include fatty acids and fatty acid alkyl esters. Alkyl esters typically include $C_1$-$C_5$ alkyl esters. One or more of methyl, ethyl, and propyl esters are preferred.

Examples of animal fats that can be used in accordance with the invention include, but are not limited to, beef fat (tallow), hog fat (lard), turkey fat, fish fat/oil, and chicken fat. The animal fats can be obtained from any suitable source including restaurants and meat production facilities.

Animal fats as referred to herein also include processed animal fat material. Non-limiting examples of processed animal fat material include fatty acids and fatty acid alkyl esters. Alkyl esters typically include $C_1$-$C_5$ alkyl esters. One or more of methyl, ethyl, and propyl esters are preferred.

Algae oils or lipids are typically contained in algae in the form of membrane components, storage products, and metabolites. Certain algal strains, particularly microalgae such as diatoms and cyanobacteria, contain proportionally high levels of lipids. Algal sources for the algae oils can contain varying amounts, e.g., from 2 wt % to 40 wt % of lipids, based on total weight of the biomass itself.

Algal sources for algae oils include, but are not limited to, unicellular and multicellular algae. Examples of such algae include a rhodophyte, chlorophyte, heterokontophyte, tribophyte, glaucophyte, chlorarachniophyte, euglenoid, haptophyte, cryptomonad, dinoflagellum, phytoplankton, and the like, and combinations thereof. In one embodiment, algae can be of the classes Chlorophyceae and/or Haptophyta. Specific species can include, but are not limited to, *Neochloris oleoabundans, Scenedesmus dimorphus, Euglena gracilis, Phaeodactylum tricornutum, Pleurochrysis camerae, Prymnesium parvum, Tetraselmis chui,* and *Chlamydomonas reinhardtii*.

The feedstock can include varying amounts of feedstreams based on biocomponent sources. In embodiments where a biocomponent portion is included in the feedstock, the boiling point and/or cloud point of the combined mineral plus biocomponent feedstock can correspond to the values provided above for a mineral feedstock. When desired, the feed can include at least about 0.1 wt % of feed based on a biocomponent source, for example at least about 0.5 wt %, at least about 1 wt %, at least about 3 wt %, at least about 5 wt %, at least about 10 wt %, at least about 15 wt %, or at least about 20 wt %. In such embodiments, the feed can additionally or alternately include about 60 wt % or less of biocomponent feed, for example about 50 wt % or less, about 40 wt % or less, about 30 wt % or less, or about 25 wt % or less.

The biocomponent feeds useful in the present invention can include any of those which comprise primarily triglycerides and free fatty acids (FFA). The triglycerides and FFAs typically contain aliphatic hydrocarbon chains in their structure having from 8 to 36 carbons, preferably from 10 to 26 carbons, for example from 12 to 22 carbons, from 12 to 18 carbons, or from 14 to 22 carbons. Types of triglycerides can be determined according to their fatty acid constituents. The fatty acid constituents can be readily determined using Gas Chromatography (GC) analysis. This analysis involves extracting the fat or oil, saponifying (hydrolyzing) the fat or oil, preparing an alkyl (e.g., methyl) ester of the saponified fat or oil, and determining the type of (methyl) ester using GC analysis. In one embodiment, a majority (i.e., greater than 50%) of the triglyceride present in the lipid material can be comprised of $C_{10}$ to $C_{26}$ fatty acid constituents, based on total triglyceride present in the lipid material. Further, a triglyceride is a molecule having a structure identical to the reaction product of glycerol and three fatty acids. Thus, although a triglyceride is described herein as being comprised of fatty acids, it should be understood that the fatty acid component does not necessarily contain a carboxylic acid hydrogen. Additionally or alternately, a majority of triglycerides present in the biocomponent feed can preferably be comprised of $C_{12}$ to $C_{18}$ fatty acid constituents, based on total triglyceride content. Other types of feed that are derived from biological raw material components can include fatty acid esters, such as fatty acid alkyl esters (e.g., FAME and/or FAEE).

Biocomponent based diesel boiling range feedstreams typically have relatively low nitrogen and sulfur contents. For example, a biocomponent based feedstream can contain up to about 300 wppm nitrogen, for example up to about 100 wppm nitrogen. Instead of nitrogen and/or sulfur, the primary heteroatom component in biocomponent feeds is oxygen. Biocomponent diesel boiling range feedstreams, e.g., can include as much as about 14 wt % oxygen content, as much as about 12 wt % oxygen content, or as much as about 10 wt % oxygen content. Suitable biocomponent diesel boiling range feedstreams, prior to hydrotreatment, can include at least about 5 wt % oxygen content, for example at least about 8 wt % oxygen content. Additionally or alternately, a biocomponent feedstream, prior to hydrotreatment, can include an olefin content of at least about 3 wt %, for example at least about 5 wt % or at least about 10 wt %. The biocomponent portion of the feedstock can have been previously hydrotreated, or not previously hydrotreated.

The content of sulfur, nitrogen, oxygen, and olefins in a feedstock created by blending two or more feedstocks can typically be determined using a weighted average based on the blended feeds. For example, a mineral feed and a biocomponent feed can be blended in a ratio of about 80 wt % mineral feed and about 20 wt % biocomponent feed. If the mineral feed has a sulfur content of about 1000 wppm, and the biocomponent feed has a sulfur content of about 10 wppm, the resulting blended feed could be expected to have a sulfur content of about 802 wppm.

Hydrotreating Stage

In various embodiments, the feedstock can be hydrotreated in one or more hydrotreating stages and/or reactors. A hydrotreatment stage can be in any suitable type of hydrotreatment reactor, such as a trickle-bed reactor or another type of reactor that can include a continuous gas phase. A hydrotreatment stage can involve exposing the feedstock to a suitable hydrotreating catalyst in the presence of hydrogen under hydrotreating conditions.

A hydrotreatment catalyst can contain at least one of Group VIB and/or Group VIII metals, optionally on a support. Examples of suitable (optional) support materials can include alumina, silica, titania, zirconia, silica-alumina, combinations thereof, or any other suitable refractory material. Examples of Group VIB metals can include molybdenum and/or tungsten. Examples of Group VIII materials can include nickel, cobalt, and/or iron. The hydrotreating conditions can include one or more of: a temperature from about 260° C. to about 425° C., for example from about 300° C. to about 400° C.; a total pressure of at least about 300 psig (about 2.1 MPag), for example at least about 350 psig (about 2.4 MPag) or at least about 400 psig (about 2.8 MPag); a total pressure of about 3000 psig (about 20.7 MPag) or less, for example about 1500 psig (about 10.3 MPag) or less, or about 800 psig (about 5.5 MPag) or less; a liquid hourly space velocity (LHSV) of at least about 0.1 $hr^{-1}$, for example at least about 0.2 $hr^{-1}$, at least about 0.4 $hr^{-1}$, or at least about 0.5 hr$^{-1}$; an LHSV of about 15 hr$^{-1}$ or less, for example about 10 hr$^{-1}$ or less, about 5 hr$^{-1}$ or less, about 2 hr$^{-1}$ or less, about 1.5 hr$^{-1}$ or less, or about 1.2 hr$^{-1}$ or less (note that the LHSV refers to the space velocity relative to catalyst for the hydrotreating stage(s), and therefore does not reflect the catalyst volume of any subsequent stage such as a dewaxing stage); a hydrogen treat gas rate of at least about 500 scf/bbl (about 85 Nm$^3$/m$^3$), for example at least about 1000 scf/bbl (about 170 Nm$^3$/m$^3$); and a hydrogen treat gas rate of about 10000 scf/bbl (about 1700 Nm$^3$/m$^3$) or less, for example about 5000 scf/bbl (about 850 Nm$^3$/m$^3$) or less.

During hydrotreatment, the sulfur and nitrogen contents of the feedstock can preferably be reduced. With regard to sulfur, one or more hydrotreatment stages can advantageously reduce the sulfur content to a suitable level, such to about 1000 wppm or less, for example about 500 wppm or less, about 50 wppm or less, about 30 wppm or less, about 20 wppm or less, about 15 wppm or less, or about 10 wppm or less. With regard to nitrogen, the hydrotreating stage(s) can additionally or alternately reduce the nitrogen content of the feed to about 100 wppm or less, for example about 50 wppm or less, about 20 wppm or less, about 15 wppm or less, about 10 wppm or less, or about 5 wppm or less. Hydrotreatment can additionally or alternately be used to deoxygenate (e.g., substantially deoxygenate, which can correspond to removing at least 90 mol %, for example at least 95 mol %, at least 98 mol %, or at least 99 mol % of the oxygen present, and/or which can correspond to reducing the oxygenate level to 0.1 wt % or less, for example 0.05 wt % or less, 0.01 wt % or less, or 0.005 wt % or less) the biocomponent or other oxygen-containing feedstock. Deoxygenating a feed can avoid problems with catalyst poisoning and/or deactivation due to the creation of water or carbon oxides during hydroprocessing.

After hydrotreatment, the resulting hydrotreated effluent can have an aromatics content. The aromatics content of the hydrotreated effluent can advantageously be at least about 10 wt %, for example at least about 15 wt % or at least about 20 wt %.

Separation and Gas Recycling

After hydrotreatment, a separation device can be used to separate out impurities prior to passing the hydrotreated feedstock to the dewaxing stage. The separation device can be a separator, a stripper, a fractionator, or another device, or another combination of devices suitable for separating gas-phase products from liquid-phase products. For example, a separator stage can be used to remove various contaminants, such as H$_2$S and NH$_3$, formed during hydrotreatment, as well as other gas phase species such as H$_2$ or any low boiling products. The separator stage can be a hot or cold separation stage, or a combination of hot and cold separation. The separation stage can operate at a pressure similar to the prior hydroprocessing stage, which can be referred to as a high pressure separation stage, or the pressure can be allowed to drop across the separation stage.

In an embodiment, the gas phase effluent from a separation stage can be used to provide recycled hydrogen for a hydrotreatment stage. The gas phase effluent can be treated to remove contaminants or other undesirable components in the gas, such as H$_2$S, NH$_3$, light ends, and the like, and combinations thereof. The remaining gas stream can contain H$_2$, e.g., in a concentration suitable for use in further hydroprocessing. If desired, this stream can be compressed to provide sufficient pressure for introducing the stream back into a hydrotreatment stage. Additionally or alternately, the liquid effluent from the high-pressure zone of the hydrotreating stage can be stripped to remove light hydrocarbon materials, at which point it can be suitable for use as a distillate fuel.

Additionally or alternately, the separation stage can allow both for recycling of hydrogen and for providing a liquid product stream for use in the dewaxing stage(s). In such embodiments, the effluent from the hydrotreatment stages can be passed through a hot, high pressure separator, which can be used to separate the hydrotreated effluent into a liquid effluent and a gas phase effluent. The gas phase effluent can generally include H$_2$ and H$_2$S, as well as other species. At least a portion of this gas phase effluent can be split off as a slip stream for use as a stream provided to the liquid-continuous dewaxing reactor. If desired, this slip stream can be combined with fresh hydrogen-rich gas, typically from a makeup compressor, e.g., to form the total treat gas used in the dewaxing stage. In such slip stream embodiments, the remainder of the gas stream from the hot, high-pressure separator can then be sent to a cold, high-pressure separator. If desired, the gas phase effluent from the cold separator can then undergo removal of contaminants from a hydrogen-containing stream, e.g., using a conventional process such as an amine scrubber, at which point the now-purified hydrogen-containing stream can then be compressed using a recycle compressor and may optionally be used in a hydrotreatment stage.

Catalytic Dewaxing in a Liquid-Continuous Reactor

One option for hydroprocessing a feedstock can be to conduct the reactions in a reactor in which the liquid phase represents the continuous phase in the reactor. Traditionally, hydroprocessing has been conducted in trickle-bed reactors where an excess of gas results in a continuous gas phase in the reactor. In a liquid-continuous reactor, the feedstock can be exposed to one or more beds of catalyst. The reactor can contain a dewaxing catalyst, which can be used alone or in conjunction with other types of catalysts, such as those suitable for hydrotreating (e.g., hydrodenitrogenation, hydrodeoxygenation, and/or hydrodesulfurization) and/or hydrocracking. The liquid can enter from the top or upper portions of the reactor and can flow downward through the reactor. This downward liquid flow can assist in allowing the catalyst to remain in place in the catalyst bed.

A hydroprocessing process can typically involve exposing a feed to a catalyst in the presence of hydrogen. Without being bound by any particular theory, in a conventional trickle-bed reactor, the reactor can be operated so that three "phases" are present in the reactor. The hydroprocessing catalyst corresponds to the solid phase. Another substantial portion of the reactor volume is occupied by a gas phase, typically including hydrogen, optionally some diluent gases, and other gases such as contaminant gases that can form during hydroprocessing. The hydrogen gas in the gas phase is typically present in substantial excess relative to the amount required for the hydroprocessing reaction. In a conventional trickle-bed reactor, the solid hydroprocessing catalyst and the gas phase can occupy at least about 80% of the reactor volume, for example at least about 85% or at least about 90%. The third "phase" can correspond to the liquid feedstock. In a conventional trickle-bed reactor, the feedstock may only occupy a small portion of the volume, such as less than about 20%, for example less than about 10% or less than about 5%. As a result, the liquid feedstock may not form a continuous phase. Instead, the liquid "phase" may include, for example, thin films of feedstock that coat the hydroprocessing catalyst particles.

Without being bound by any particular theory, a liquid-continuous reactor provides a different type of processing environment as compared to a trickle-bed reactor. In a liquid-continuous reactor, the reaction zone can be primarily composed of two phases. One phase can be a solid phase corresponding to the hydroprocessing catalyst. The second phase can be a liquid phase corresponding to the feedstock, which can be present as a continuous phase in a liquid-continuous reactor. In an embodiment, the hydrogen that will be consumed during the hydroprocessing reaction can be dissolved in the liquid phase. Depending on the quantity of hydrogen used, a portion of the hydrogen could also be in the form of bubbles of hydrogen in the liquid, in which case it would be assumed that the hydrogen was dissolved in the liquid phase at approximately the solubility limit (i.e., the liquid phase can be saturated with hydrogen, but "saturated" is meant here physically rather than chemically; in the context of solubility of gas in liquid, as used herein, the phrase "approximately the solubility limit" should be understood to mean a concentration corresponding to at least 85% of the solubility limit, preferably to at least 90% of the solubility limit, for example to at least 95% of the solubility limit or to at least 99% of the solubility limit, which can, of course, include super-saturated solutions, that may correspond to up to 115% of the solubility limit, preferably to up to 110% of the solubility limit, for example to up to 105% of the solubility limit). Thus, the gas phase hydrogen would correspond to hydrogen that is in addition to the hydrogen dissolved in the liquid phase. In practical embodiments, hydrogen dissolved in the liquid phase can be depleted as the reactions progress in/through the liquid-continuous reactor. In such embodiments, hydrogen originally present in the form of gaseous bubbles can dissolve into the liquid phase to resaturate the liquid phase and provide additional hydrogen for reaction. In various embodiments, the volume occupied by a gas phase in the liquid-continuous reactor can be less than about 10% of the reactor volume, or less than about 5%.

The liquid feed to the dewaxing reactor can be well mixed with a hydrogen-containing treat gas. The hydrogen-containing treat gas can contain at least about 50 vol % of hydrogen, or at least about 80 vol %, or at least about 90 vol %, or at least about 95 vol %. Excess gas can be vented from the mixture before it enters the reactor, or excess gas can be vented directly from the reactor. The liquid level in the reactor can be controlled so that the catalyst in the reactor is substantially (e.g., completely) wetted.

In some embodiments, the hydroprocessing reactions in a bed, stage, and/or reactor can require more hydrogen than can be dissolved in the liquid phase. In such embodiments, one or more techniques can be used to provide additional hydrogen for the hydroprocessing reaction. One option can be to recycle a portion of the product from the reactor. A recycled portion of product has already passed through a hydroprocessing stage, and therefore will likely have a reduced hydrogen consumption as it passes through the hydroprocessing stage again. Additionally or alternately, the solubility of the recycled feed can be higher than a comparable unprocessed feed. As a result, including a portion of recycled product with fresh feed can increase the amount of hydrogen available for reaction with the fresh feed.

Additionally or alternately, additional streams of hydrogen can be introduced into a reactor directly. One or more additional hydrogen streams can be introduced at any convenient location in a reactor. The additional hydrogen streams can include a stream of make-up hydrogen, a stream of recycled hydrogen, any other convenient hydrogen-containing stream, or a combination thereof. In some embodiments, both product recycle and injection of additional hydrogen streams along the axial dimension of the reactor can be used to provide sufficient hydrogen for a reaction.

In embodiments involving recycle of the dewaxed product for use as part of the input to the dewaxing stage, the ratio of the amount by volume of product recycle to the amount of fresh feed into the dewaxing stage can be at least about 0.33:1, for example at least about 0.5:1, at least about 1:1, or at least about 1.5:1. Additionally or alternately, the ratio of the amount by volume of product recycle to the amount of fresh feed can be about 4:1 or less, for example about 3:1 or less, about 2.5:1 or less, or about 2:1 or less.

Additionally or alternately, a contaminant gas, such as $H_2S$, can be dissolved in a feedstock. A contaminant gas, such as $H_2S$, can be purposefully introduced to partially provide additional hydrogen functionality, thus partially reducing the hydrogen consumption in the liquid-continuous stage. For example, an overhead gas flow from a separation device in the hydrotreating stage can be a gas flow that includes both hydrogen and a contaminant gas.

One example of a process that can be performed in a liquid-continuous reactor is a catalytic dewaxing process. Catalytic dewaxing can be performed by exposing a feedstock to a dewaxing catalyst under effective (catalytic) dewaxing conditions. Effective dewaxing temperatures can be at least about 500° F. (about 260° C.), for example at least about 550° F. (about 288° C.), at least about 600° F. (about 316° C.), or at least about 650° F. (about 343° C.). Additionally or alternately, the temperature can be about 750° F. (about 399° C.) or less, for example about 700° F. (about 371° C.) or less or about 650° F. (about 343° C.) or less. Effective dewaxing pressures can be at least about 200 psig (about 1.4 MPag), for example at least about 400 psig (about 2.8 MPag), at least about 500 psig (about 3.4 MPag), at least about 750 psig (about 5.2 MPag), or at least about 1000 psig (about 6.9 MPag). Additionally or alternately, the pressure can be about 2250 psig (about 15.5 MPag) or less, for example about 1500 psig (about 10.3 MPag) or less, about 1200 psig (about 8.2 MPag) or less, about 1000 psig (about 6.9 MPag) or less, or about 800 psig (about 5.5 MPag) or less. Effective dewaxing LHSVs can be at least about 0.1 $hr^{-1}$, for example at least about 0.2 $hr^{-1}$, at least about 0.5 $hr^{-1}$, at least about 1.0 $hr^{-1}$, or at least about 1.5 $hr^{-1}$. Additionally or alternately, the LHSV can be about 15 $hr^{-1}$ or less, for example about 10.0 $hr^{-1}$ or less, about 5.0 $hr^{-1}$ or less, about 3.0 $hr^{-1}$ or less, or about 2.0 $hr^{-1}$ or less. Further additionally or alternately, the temperature, pressure, and LHSV for a liquid-continuous reactor can comprise conditions suitable for use in a trickle bed reactor.

In embodiments where excess gas is vented off from the liquid, the available hydrogen in the reactor can thus correspond roughly to the amount of hydrogen dissolved in the liquid. In such situations, a higher treat gas rate may not necessarily lead to an increase in the amount of available hydrogen, at which point the effective treat gas rate within a reactor may be dependent on the solubility limit of the liquid (feedstock). The hydrogen solubility limit for a typical hydrocarbon feedstock can be in the range from about 30 scf/bbl (about 5.1 $Nm^3/m^3$) to about 200 scf/bbl (about 34 $Nm^3/m^3$).

One advantage of a liquid-continuous reactor can be that the reactor does not see a relatively large excess of hydrogen, which itself can be a financial drain and/or can require complex/expensive separation equipment, e.g., to allow for recovery and/or recycling of excess hydrogen. Typically, the recycle compressor used for hydrogen recycle in a trickle-bed reactor can correspond to approximately 10-15% of the total cost of the erected processing unit. Instead, it can be desirable for a liquid-continuous reactor to supply to the reactor only an amount of hydrogen comparable to the amount needed for a hydroprocessing reaction, e.g., to mitigate catalyst coking. For example, a catalytic dewaxing process can consume from about 25 scf/bbl (about 9 Nm³/m³) of hydrogen to about 500 scf/bbl (about 85 Nm³/m³).

Alone or in combination with other hydrogen control measures, the amount of hydrogen consumed during the catalytic dewaxing can be controlled by saturating the feed with a gaseous mixture of hydrogen and a hydrogen-supplementing contaminant, such as $H_2S$. Without being bound by any particular theory, it is believed that introducing $H_2S$ into a catalytic dewaxing stage can suppress activity of the dewaxing catalyst, including activity for aromatic saturation. $H_2S$ (and/or a similar contaminant) can be introduced into the dewaxing stage by using at least a portion of the gas phase effluent from the product separation section of the hydrotreating zone. For example, both a make-up hydrogen stream and a slip stream from the gas-phase effluent of the separation stage can be available for dissolution into the hydrotreated liquid effluent, e.g., up to approximately the solubility limit. One or more valves can be used to regulate the mixture of makeup hydrogen and gas phase separator effluent to use for saturating (physically, not chemically) the hydrotreated liquid effluent. One option could be to monitor the $H_2S$ content of the gaseous output from the hydrotreating stage using an $H_2S$ analyzer. Thus, the amount of the gas phase separator effluent containing the $H_2S$ can be controlled to achieve a desired concentration of $H_2S$ in the liquid-continuous reactor treat gas. Additionally or alternately, the gas phase separator effluent can be added in a sufficient amount so that at least about 0.1 mol % of the gas dissolved in the input feed to the liquid-continuous reactor comprises $H_2S$, for example at least about 0.3 mol %, at least about 0.5 mol %, at least 1 mol %, or at least about 1.5 mol %. Further additionally or alternately, the amount of $H_2S$ dissolved in the feed can be about 10 mol % or less of the total dissolved gas, for example about 5 mol % or less, about 2 mol % or less, about 1 mol % or less, or about 0.5 mol % or less. Still further additionally or alternately, the $H_2S$ dissolved in the liquid product stream after dewaxing can be at least about 25 wppm, for example at least about 50 wppm or at least about 100 wppm.

In an embodiment involving introduction of a contaminant gas, such as $H_2S$, the amount of aromatics saturation can advantageously be reduced. In such an embodiment, the aromatics content of the effluent from the dewaxing stage can be at least about 50% of the aromatics content of the input to the dewaxing stage, for example at least about 65% or at least about 75%. In various embodiments, the input to the dewaxing stage can correspond to at least a portion of the hydrotreated effluent.

Catalytic dewaxing relates to the removal and/or isomerization of relatively long-chain, paraffinic molecules from feeds. Catalytic dewaxing can be accomplished by selectively cracking and/or by hydroisomerizing these linear molecules. Hydrodewaxing catalysts can comprise molecular sieves such as crystalline aluminosilicates (zeolites) or silicoaluminophosphates (SAPOs). Additionally or alternately, the molecular sieve can be a 1-D or 3-D molecular sieve, for example a 10-member ring 1-D molecular sieve. Examples of molecular sieves useful for dewaxing can include, but are not limited to, ZSM-48, ZSM-22, ZSM-23, ZSM-35, zeolite Beta, USY, ZSM-5, and combinations thereof. In a preferred embodiment, the molecular sieve can comprise ZSM-5, ZSM-22, ZSM-23, ZSM-35, ZSM-48, and combinations thereof, particularly ZSM-5, ZSM-48, and/or ZSM-23. Optionally, the dewaxing catalyst can include a binder, such as alumina, titania, silica, silica-alumina, zirconia, or a combination thereof, for example alumina and/or titania, or one or more of titania, silica, and zirconia. Additionally or alternately, a portion of the catalyst in the dewaxing reactor can comprise or be a hydrotreatment catalyst.

One feature of molecular sieves that can impact the activity of the molecular sieve includes the ratio of silica to alumina ($Si/Al_2$) in the molecular sieve. For instance, the molecular sieve can have a silica to alumina ratio of about 200:1 or less, for example about 120:1 or less, about 100:1 or less, about 90:1 or less, or about 75:1 or less. Additionally or alternately, the molecular sieve can have a silica to alumina ratio of at least about 30:1, for example at least about 50:1 or at least about 65:1.

The dewaxing catalyst can also typically include a metal hydrogenation component, such as a Group VIII metal. Suitable Group VIII metals can include Pt, Pd, Ni, or combinations thereof. The dewaxing catalyst can include at least about 0.1 wt % of the Group VIII metal(s), for example at least about 0.3 wt %, at least about 0.5 wt %, at least about 1.0 wt %, at least about 2.5 wt %, or at least about 5.0 wt %. Additionally or alternately, the dewaxing catalyst can include about 10.0 wt % or less of the Group VIII metal(s), for example about 5.0 wt % or less, about 2.5 wt % or less, about 1.5 wt % or less, or about 1.0 wt % or less.

In some embodiments, the dewaxing catalyst can include as an additional hydrogenation component at least one Group VIB metal, such as W and/or Mo. Such Group VIB metals can typically be used in conjunction with the at least one Group VIII metal, such as Ni and/or Co. An example of such an embodiment could be a dewaxing catalyst that includes NiW, NiMo, or NiMoW. When present, the dewaxing catalyst can include at least about 0.5 wt % of the Group VIB metal(s), for example at least about 1.0 wt %, at least about 2.5 wt %, or at least about 5.0 wt %. Additionally or alternately, the dewaxing catalyst can include about 20.0 wt % or less of the Group VIB metal(s), for example about 15.0 wt % or less, about 10.0 wt % or less, about 5.0 wt % or less, or about 1.0 wt % or less. Where the dewaxing catalyst contains only Group VIII metals, however, Pt and/or Pd is(are) the preferred Group VIII metal(s).

Distillate Product Properties

Typical mineral distillate feeds suitable for conversion into a diesel fuel product can have initial cloud points of at least about 15° F. (about −9° C.), for example from about 25° F. (about −4° C.) to about 50° F. (about 10° C.). However, some types of waxy heavy atmospheric gas oils can have cloud points up to about 70° F. (about 21° C.), for example up to about 60° F. (about 16° C.). Similarly, the initial cloud point of typical biocomponent feeds can be up to about 70° F. (about 21° C.). In various embodiments, a product from the dewaxing stage can be a distillate product that can be characterized by at least one cold flow property, such as a pour point, a cloud point, or a cold filter plugging point. When a diesel fuel product is produced by the above methods, the diesel product can advantageously have a cloud point at least about 5° C. lower than the cloud point of the feed into the dewaxing stage, for example at least about 10° C. lower, at least about 20° C. lower, at least about 30° C. lower, or at least about 40° C. lower. Additionally or alternately, the cloud point of the dewaxed product can be about −5° C. or less, for example about −10° C. or less, about −15° C. or less, or about −20° C. or less. Further additionally or alternately, the cloud point of the dewaxed feed can be at least about −35° C., for example at least about −30° C. or at least about −25° C. Still further additionally or alternately, the product from the dewaxing stage can have at least one cold flow property that is at least about 10° C. lower than the corresponding property of the feedstock, for example at least about 20° C. lower or at least about 30° C. lower.

Additional Embodiments

Additionally or alternately, the invention can include one or more of the following embodiments.

Embodiment 1

A method for making a diesel fuel product, comprising: contacting a feedstock with a hydrotreating catalyst under effective hydrotreating conditions in a hydrotreatment reactor that includes a continuous gas phase to make a hydrotreated effluent; separating the hydrotreated effluent into at least a hydrotreated liquid product and a gas-phase product, the hydrotreated liquid product having a cloud point, the gas-phase product including $H_2$ and $H_2S$; mixing the hydrotreated liquid product with a hydrogen-containing stream and at least a portion of the gas-phase product to produce a hydrotreated dewaxing input stream, the hydrotreated dewaxing input stream having an $H_2S$ content corresponding to at least about 0.1 mol % of a total gas content in the hydrotreated dewaxing input stream; and contacting the hydrotreated dewaxing input stream with a dewaxing catalyst under effective catalytic dewaxing conditions in a liquid-continuous reactor to form a dewaxed effluent that includes a dewaxed distillate product, the dewaxed effluent having a cold flow property that is at least about 9° F. (about 5° C.) less than a corresponding cold flow property of the feedstock, the cold flow property comprising one or more of a cloud point, a pour point, and a cold filter plugging point.

Embodiment 2

The method of embodiment 1, wherein the dewaxed effluent has a second aromatics content of at least about 50% of a first aromatics content of the hydrotreated effluent.

Embodiment 3

A method for making a diesel fuel product, comprising: providing a feedstock having a cloud point of at least about 15° F. (about −4° C.) and having a first aromatics content; contacting the feedstock with a hydrotreating catalyst under effective hydrotreating conditions in a hydrotreatment reactor that includes a continuous gas phase to make a hydrotreated effluent; separating the hydrotreated effluent into at least a hydrotreated liquid product and a gas phase product, the gas phase product including $H_2$ and $H_2S$; mixing the hydrotreated liquid product with a hydrogen containing stream and the gas phase product to form a hydrotreated dewaxing input stream; and contacting the hydrotreated dewaxing input stream with a dewaxing catalyst under effective catalytic dewaxing conditions in a liquid-continuous reactor to form a dewaxed effluent including a dewaxed distillate product, the dewaxed effluent having a second aromatics content that is at least about 50% of the first aromatics content, and the dewaxed effluent also having a cloud point at least about 9° F. (5° C.) lower than the cloud point of the feedstock.

Embodiment 4

The method of any one of the previous embodiments, wherein the mixing comprises adjusting a ratio of the hydrogen-containing stream and the at least a portion of the gas-phase product to reduce the hydrogen consumption in the liquid-continuous reactor to about 20 $Nm^3/m^3$ or less.

Embodiment 5

The method of any one of the previous embodiments, wherein at least a portion of the dewaxed effluent from the liquid-continuous reactor is recycled by mixing it with the hydrotreated liquid product prior to said mixing with the hydrogen-containing stream.

Embodiment 6

The method of any one of the previous embodiments, wherein at least a portion of the dewaxed effluent from the liquid-continuous reactor is mixed with a hydrogen-containing stream and recycled as an input stream to the liquid-continuous reactor.

Embodiment 7

The method of any one of the previous embodiments, wherein the contacting in the liquid-continuous reactor comprises: removing at least a portion of the hydrotreated dewaxing input stream from the liquid-continuous reactor; dissolving hydrogen in the removed portion; and passing the removed portion containing the dissolved hydrogen back into the liquid-continuous reactor.

Embodiment 8

The method of any one of the previous embodiments, wherein the effective catalytic dewaxing conditions include a temperature from about 500° F. (about 260° C.) to about 750° F. (about 399° C.), a total pressure from about 200 psig (about 1.4 MPag) to about 2250 psig (about 15.5 MPag), and an LHSV from about 0.2 $hr^{-1}$ to about 15 $hr^{-1}$.

Embodiment 9

The method of any one of the previous embodiments, wherein effective hydrotreating conditions include a temperature from about 500° F. (about 260° C.) to about 800° F. (about 425° C.), a total pressure from about 200 psig (about 1.4 MPag) to about 3000 psig (about 20.7 MPag), an LHSV from about 0.2 $hr^{-1}$ to about 15 $hr^{-1}$, and a hydrogen treat gas rate from about 500 scf/bbl (about 85 $Nm^3/m^3$) to about 10000 scf/bbl (about 1700 $Nm^3/m^3$).

Embodiment 10

The method of any one of the previous embodiments, wherein the dewaxing catalyst comprises a molecular sieve and a supported metal, the molecular sieve comprising ZSM-5, ZSM-22, ZSM-23, ZSM-35, ZSM-48, or a combination thereof.

Embodiment 11

The method of embodiment 10, wherein the molecular sieve is ZSM-23, ZSM-48, ZSM-5, or a combination thereof.

Embodiment 12

The method of any one of the previous embodiments, further comprising: separating the hydrotreated effluent into at least a hydrotreated liquid product and two gas-phase products, the gas-phase products each including at least $H_2$ and $H_2S$; providing a first gas-phase product for mixing with the hydrotreated liquid product; recovering hydrogen from a second gas-phase product; and recycling the recovered hydrogen.

Embodiment 13

The method of any one of the previous embodiments, wherein the hydrotreated dewaxing input stream has an $H_2S$ content of at least about 0.5 mol % of the total gas in the hydrotreated dewaxing input stream.

Embodiment 14

The method of any one of embodiments 2-13, wherein the second aromatics content is at least about 65% of the first aromatics content.

Example of a Reaction System

Figure 1:
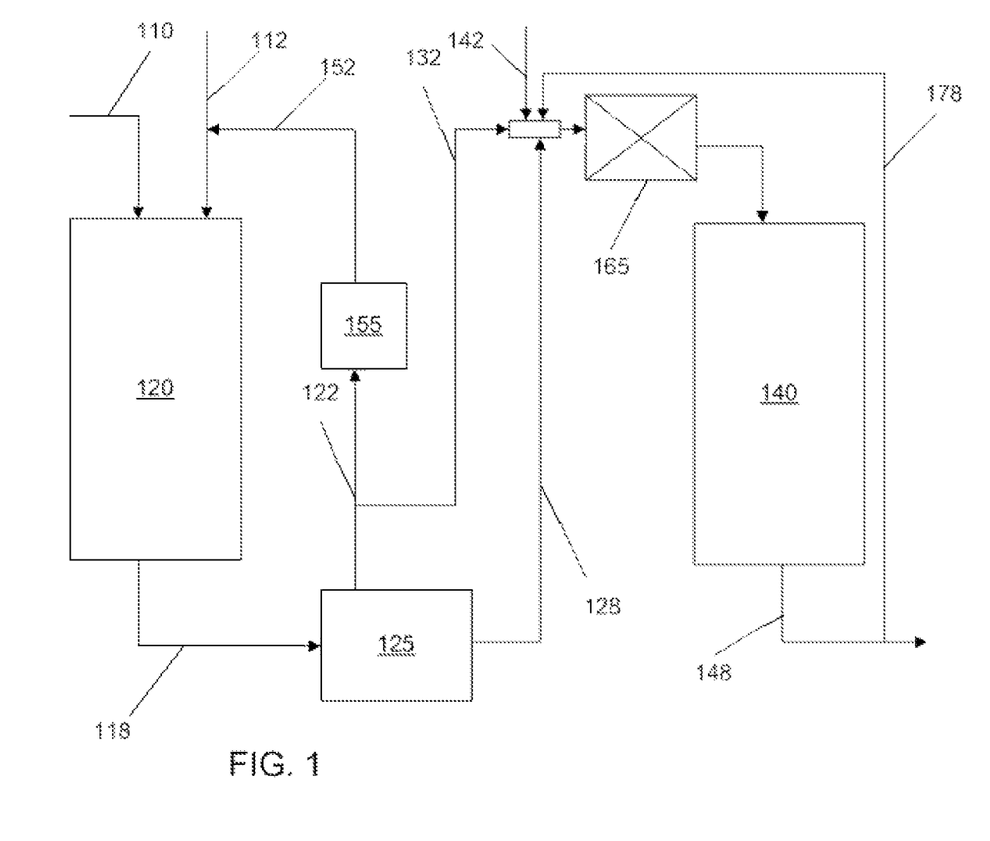
FIG. 1 schematically depicts a reaction system suitable for performing an embodiment of the invention.

A reaction system suitable for carrying out the above processes is shown schematically in FIG. 1. In FIG. 1, a hydrocarbon feedstock 110 is introduced into a first hydrotreatment reactor 120. A hydrogen treat gas stream 115 is also introduced into hydrotreatment reactor 120. Optionally, the hydrogen treat gas stream 115 can include a portion of recycled hydrogen gas stream 152. The hydrocarbon feedstock is exposed to hydrotreating conditions in first hydrotreatment reactor 120 in the presence of one or more catalyst beds that contain hydrotreating catalyst. The hydrotreatment can reduce the sulfur content of the treated feedstock to about 500 ppm by weight or less, or about 50 wppm or less, or about 10 wppm or less.

The hydrotreated feedstock 118 optionally flows from hydrotreatment reactor 110 into a separation stage 125, where gas phase products are separated from liquid phase products. Separation stage 125 is shown as a single element, but stage 125 can represent multiple devices that perform the function of a separation stage. In the embodiment shown in FIG. 1, separation stage 125 produces a hydrotreated liquid stream 128, an optional gaseous slip stream 132, and a gaseous stream 122 for recycling. The stream 122 for recycling is passed to a purification stage 155. This can include, for example, an amine scrubber to remove contaminants from the stream. The stream can then be added to the hydrogen loop of the refinery. Alternatively, the embodiment shown in FIG. 1 shows the output 152 from purification stage 155 being used as part of the hydrogen for hydrotreatment reactor 120. Optionally, the output 152 from the purification stage 155 can be compressed (not shown) before being added to the refinery hydrogen loop and/or to another process.

The hydrotreated liquid stream 128 from the separation stage is then passed to the liquid-continuous dewaxing reactor 140. Prior to entering reactor 140, the hydrotreated liquid stream 128 can be saturated or partially saturated with hydrogen. This can be accomplished, for example, by adding a hydrogen stream 142 to hydrotreated liquid stream 128 and then mixing the streams in static mixer 165. An optional slip stream 132 from the separation stage 125 can also be added to the stream that enter static mixer 165. Optionally, the liquid may be flashed after leaving the static mixer to remove excess gas. Alternatively, excess gas in the liquid leaving the static mixer may be vented directly from reactor 140.

After mixing to generate a saturated or partially saturated hydrotreated liquid stream 128, the hydrotreated liquid stream enters reactor 140. The hydrotreated liquid stream can be combined with a liquid recycle stream 178 prior to mixing with gaseous streams 132 and 142. The liquid-continuous dewaxing reactor 140 dewaxes feed and generates a diesel product stream 148. Liquid recycle stream 178 can be drawn off from diesel product stream 148. Optionally, reactor 140 can also include a portion of hydrodesulfurization catalyst.

Figure 2:
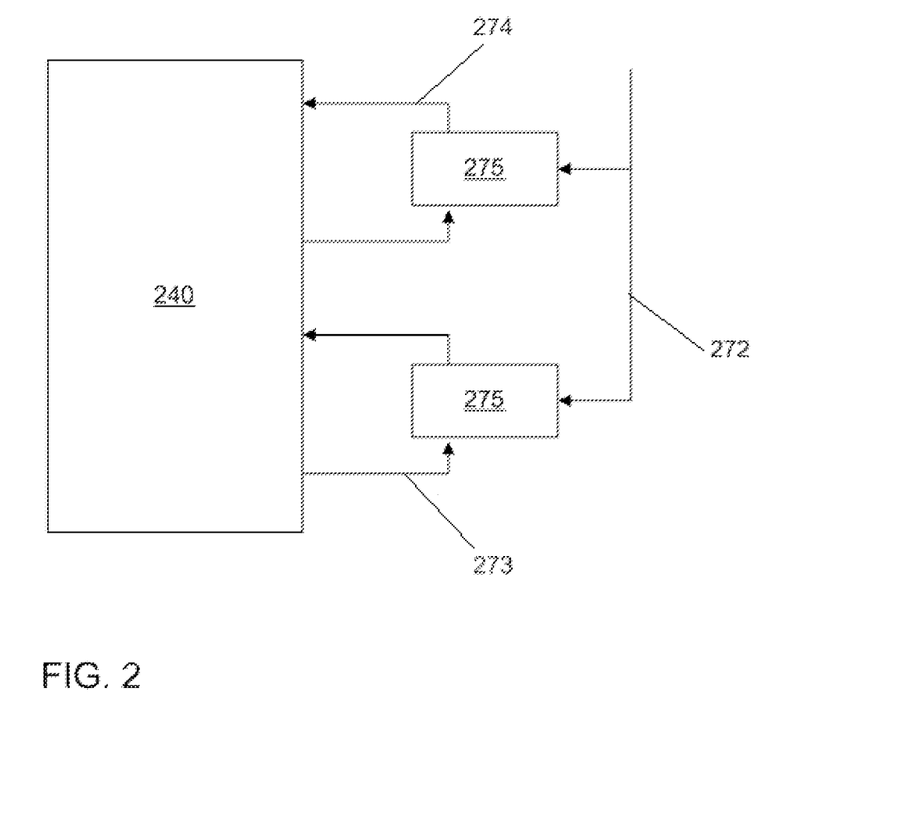
FIG. 2 schematically depicts a portion of a reaction system suitable for performing an embodiment of the invention.

FIG. 2 schematically shows another option for introducing hydrogen into a liquid-continuous reactor. In FIG. 2, two mixers 275 are shown for mixing hydrogen with a liquid. Side streams of liquid 273 are removed from reactor 240 and introduced into mixers 275. The mixers saturate liquid with hydrogen from hydrogen stream 272. The saturated liquid 274 is then returned to the reactor 240. It may also be possible to saturate liquid within the reactor within hydrogen without having to withdraw (and reinject) any liquid material from the reactor.

Example 1

The following is a prophetic example. A heavy atmospheric gas oil is selected as a feedstock. The feedstock has a boiling range from about 225° C. to about 440° C. The cloud point of the feedstock is about −4° C. The sulfur content of the feed is about 4000 wppm. The feed is hydrotreated in a trickle-bed reactor under effective hydrotreating conditions. The catalyst includes nickel and molybdenum on an alumina support. The hydrotreated effluent is then separated into a liquid stream, a gas phase stream for recapture of recycled hydrogen, and a side stream containing hydrogen and $H_2S$. The sulfur content of the hydrotreated liquid stream is about 10 wppm.

The hydrotreated liquid stream and a make-up hydrogen stream are mixed in a static mixer to dissolve hydrogen in the liquid stream to approximately the solubility limit. A recycled product stream from the liquid-continuous reactor is also mixed with the hydrotreated liquid stream in about a 1:1 ratio, to increase the amount of hydrogen relative to the expected consumption of the feed. The (physically, not chemically) saturated liquid stream then enters a liquid-continuous reactor containing a dewaxing catalyst. The dewaxing catalyst includes alumina-bound ZSM-48 with about 0.6 wt % Pt. The saturated liquid stream is dewaxed under effective dewaxing conditions to produce a diesel fuel product having a cloud point of about −40° C. The hydrogen consumption in the stage is about 300 scf/bbl (about 51 $Nm^3/m^3$).

During processing, a decision is made to reduce the hydrogen consumption in the liquid-continuous reactor. A portion of the side stream containing $H_2$ and $H_2S$ is added to the make-up hydrogen used for saturating the streams. Introduction of the $H_2S$ reduces the hydrogen consumption in the liquid-continuous reactor to about 50 scf/bbl (about 9 $Nm^3/m^3$). Because the hydrogen consumption is reduced, there becomes no need to recycle liquid product, thereby increasing the efficiency of the dewaxing catalyst. The cloud point of the resulting liquid product is about −30° C.

Example 2

Three experiments were conducted to investigate dewaxing of a hydroprocessed distillate in a trickle-bed unit. The following examples are provided to illustrate the impact of H$_2$S on aromatics saturation and hydrogen consumption. While the experiments in Example 2 were conducted in trickle-bed reactors, the same relationship between H$_2$S and hydrogen consumption is expected to exist in liquid-continuous reactors.

In this example, dewaxing was performed on two types of feeds. Column A of Table 1 shows the properties of a hydroprocessed distillate feed. The feed in Column A has a relatively low content of both sulfur and nitrogen. The aromatic saturation occurring for this feed during dewaxing can be used as a baseline for comparison purposes.

Column B of Table 1 shows the properties of a feed that includes contaminants in the form of sulfur and nitrogen. In order to simulate the effect of using a slip stream of product gas from the hydroprocessing unit as treat gas to the dewaxing zone, the hydroprocessed feed shown in Column A was spiked with dimethyl disulfide (DMDS) and tributyl amine (TBA). After spiking, the liquid product was found, as shown in Table 1 column B, to have about 1.86 wt % sulfur and about 580 wppm nitrogen. To ensure that the DMDS and TBA were fully decomposed to H$_2$S and NH$_3$, respectively, before the feed contacted the dewaxing catalyst, an additional reactor was added upstream of the dewaxing reactor for spiking agent decomposition. This reactor contained pre-sulfided NiMo/Al$_2$O$_3$ hydrotreating catalyst and operated at about 600° F. (about 316° C.). Measurements of liquid product collected after this additional reactor confirmed substantially complete decomposition of the spiking agents. Based on this essentially complete decomposition, the treat gas entering the dewaxing reactor was calculated to contain about 1.9 mol % H$_2$S and about 0.2 mol % NH$_3$. The addition of a small amount of relatively volatile compounds is also reflected in the distillation profile of the spiked feed. Otherwise, the hydroprocessed distillate and the spiked hydroprocessed distillate had comparable properties.

A hydroprocessed distillate material having the properties shown in column A of Table 1 was dewaxed at an LHSV of about 10 hr$^{-1}$ over an alumina-bound ~0.6 wt % Pt/ZSM-48 dewaxing catalyst at about 2150 psig (about 14.8 MPag) total pressure and at a treat gas rate of about 3360 scf/bbl (about 570 Nm$^3$/m$^3$). The treat gas in these experiments was ~100% hydrogen. As noted in Table 1, the hydroprocessed distillate contained about 3.5 wppm sulfur and had a total aromatics content of about 17.0%.

TABLE 1

|  | Hydroprocessed Distillate (Column A) | Spiked Hydroprocessed Distillate (Column B) |
|---|---|---|
| API Gravity [degrees] | 40.4 | 39.5 |
| Cloud Point[° C.] | −3.6 | −3.6 |
| Sulfur [wppm] | 3.5 | 18600 |
| Nitrogen [wppm] | <0.2 | 580 |
| Simulated Distillation [° F. (° C.)] | | |
| 0.5% Off | 295 (146) | 218 (103) |
| 5% | 352 (178) | 352 (178) |

TABLE 1-continued

|  | Hydroprocessed Distillate (Column A) | Spiked Hydroprocessed Distillate (Column B) |
|---|---|---|
| 10% | 380 (193) | 381 (194) |
| 20% | 417 (214) | 418 (214) |
| 50% | 493 (256) | 493 (256) |
| 80% | 600 (316) | 601 (316) |
| 90% | 655 (346) | 657 (347) |
| 95% | 689 (365) | 693 (367) |
| 99.5% | 763 (406) | 766 (408) |
| Aromatics [wt %] | | |
| 1-ring | 15.5% | |
| 2-ring | 1.3% | |
| 3-ring | 0.1% | |
| Total | 17.0% | |
| Cetane Number (by NMR) | 57.5 | |

Results of two dewaxing experiments with the hydroprocessed distillate feed are shown in Table 2. In the second experiment, a higher dewaxing temperature was used, leading to a greater reduction in the cloud point. The cloud point of the distillate in both experiments was reduced by over 5° C. and over 95% of the aromatics in the feed were saturated. Note that no value for 3-ring aromatics is reported, as the amount present was much less than 0.1 wt % and/or was below the detection limit. Hydrogen consumption in both experiments was measured to be about 331 scf/bbl (about 56 Nm$^3$/m$^3$).

Results of the dewaxing experiment using the spiked feedstock are also shown in Table 2. The dewaxing catalyst was the same as that used in the prior experiments and was operated at the same overall treat gas rate and pressure. Liquid hourly space velocity over the dewaxing catalyst was about 15 hr$^{-1}$. A higher dewaxing temperature was used in order to achieve a desired cloud point reduction of about 5° C.

As Table 2 shows, aromatics content was only slightly reduced in this case to about 12.8%, representing a total aromatics conversion of only about 25%. Hydrogen consumption was measured to be about 171 scf/bbl (about 29 Nm$^3$/m$^3$). However, a portion of this hydrogen consumption corresponds to hydrogen consumed in the additional reactor that decomposed the DMDS and TBA. When the hydrogen consumption value is corrected for the hydrogen consumed to decompose the spiking agents, the true hydrogen consumption of the dewaxing process dropped to about 107 scf/bbl (about 18 Nm$^3$/m$^3$). This represents greater than a two thirds reduction in the process hydrogen requirements. This illustrates how using a gaseous slip stream from the hydrotreating production separation stage can be beneficial in reducing the amount of hydrogen consumed during a dewaxing stage. In a reaction environment having a continuous liquid phase, this type of reduction in hydrogen consumption would reduce the amount of product recycle required.

TABLE 2

|  | Dewaxed Hydroprocessed Distillate (Run 1) | Dewaxed Hydroprocessed Distillate (Run 2) | Dewaxed Spiked Hydroprocessed Distillate |
|---|---|---|---|
| API Gravity [degrees] | 42.3 | 42.3 | 41.3 |
| Cloud Point[° C.] | −8.0 | −12.2 | −8.3 |

TABLE 2-continued

|  | Dewaxed Hydroprocessed Distillate (Run 1) | Dewaxed Hydroprocessed Distillate (Run 2) | Dewaxed Spiked Hydroprocessed Distillate |
|---|---|---|---|
| $H_2$ Consump. [scf/bbl ($Nm^3/m^3$)] | 331 (56) | 331 (56) | 171 (29) |
| Adj. $H_2$ Consump. [scf/bbl ($Nm^3/m^3$)] | 331 (56) | 331 (56) | 107 (18) |
| Dewaxing Temp[° F. (° C.)] | 595 (313) | 614 (323) | 740 (393) |
| LHSV [$hr^{-1}$] | 10 | 10 | 15 |
| Simulated Distillation [° F. (° C.)] | | | |
| 0.5% Off | 280 (138) | 268 (131) | 208 (98) |
| 5% | 343 (173) | 339 (171) | 344 (173) |
| 10% | 369 (187) | 367 (188) | 373 (189) |
| 20% | 433 (223) | 431 (222) | 437 (225) |
| 50% | 485 (252) | 484 (251) | 487 (253) |
| 80% | 557 (292) | 555 (291) | 558 (292) |
| 90% | 649 (343) | 648 (342) | 649 (343) |
| 95% | 685 (363) | 684 (362) | 686 (363) |
| 99.5% | 755 (402) | 756 (402) | 761 (405) |
| Aromatics [wt %] | | | |
| 1-ring | 0.5% | 0.4% | 12.0% |
| 2-ring | 0.1% | 0.1% | 0.7% |
| 3-ring | — | — | 0.1% |
| Total | 0.6% | 0.5% | 12.8% |

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A method for producing a dewaxed distillate product, comprising:
    contacting a feedstock having a T95 boiling point of about 440° C. or less with a hydrotreating catalyst under effective hydrotreating conditions in a hydrotreatment reactor comprising a continuous gas phase to produce a hydrotreated effluent;
    separating the hydrotreated effluent into at least a hydrotreated liquid product having a cloud point and a gas-phase product comprising $H_2$ and $H_2S$;
    mixing the hydrotreated liquid product with a hydrogen-containing stream and at least a portion of the gas-phase product to produce a hydrotreated dewaxing input stream comprising an $H_2S$ content of about 0.1 mol % to 10 mol % of a total gas content in the hydrotreated dewaxing input; and
    contacting the hydrotreated dewaxing input stream with a dewaxing catalyst under effective catalytic dewaxing conditions in a liquid-continuous reactor to form a dewaxed effluent comprising a dewaxed distillate product having a reduced level of aromatics saturation compared to a level of aromatics saturation under otherwise identical dewaxing conditions but with $H_2S$ content below about 0.1 mol %,
    wherein the liquid-continuous reactor comprises a gas phase that is less than about 10% of the reactor volume and the dewaxed effluent has a cold flow property that is at least about 9° F. (about 5° C.) less than a corresponding cold flow property of the feedstock, and wherein the cold flow property comprises one or more of a cloud point, a pour point, and a cold filter plugging point.

2. The method of claim 1, wherein a ratio of the hydrogen-containing stream to the at least a portion of the gas-phase product is adjusted to reduce the hydrogen consumption in the liquid-continuous reactor to about 20 $Nm^3/m^3$ or less.

3. The method of claim 1, wherein at least a portion of the dewaxed effluent from the liquid-continuous reactor is recycled and mixed with the hydrotreated liquid product prior to said mixing with the hydrogen-containing stream.

4. The method of claim 1, wherein at least a portion of the dewaxed effluent from the liquid-continuous reactor is mixed with a second hydrogen-containing stream and recycled as an input stream to the liquid-continuous reactor.

5. The method of claim 1, wherein the contacting in the liquid continuous reactor comprises:
    removing at least a portion of the hydrotreated dewaxing input stream from the liquid-continuous reactor;
    dissolving hydrogen in the removed portion; and
    passing the removed portion containing the dissolved hydrogen back into the liquid-continuous reactor.

6. The method of claim 1, wherein the effective catalytic dewaxing conditions include a temperature from about 500° F. (about 260° C.) to about 750° F. (about 399° C.), a total pressure from about 200 psig (about 1.4 MPag) to about 2250 psig (about 15.5 MPag), and an LHSV from about 0.2 $hr^{-1}$ to about 15 $hr^{-1}$.

7. The method of claim 1, wherein effective hydrotreating conditions include a temperature from about 500° F. (about 260° C.) to about 800° F. (about 425° C.), a total pressure from about 200 psig (about 1.4 MPag) to about 3000 psig (about 20.7 MPag), an LHSV from about 0.2 $hr^{-1}$ to about 15 $hr^{-1}$, and a hydrogen treat gas rate from about 500 scf/bbl (about 85 $Nm^3/m^3$) to about 10000 scf/bbl (about 1700 $Nm^3/m^3$).

8. The method of claim 1, wherein the dewaxing catalyst comprises a molecular sieve and a supported metal, wherein the molecular sieve comprises ZSM-5, ZSM-22, ZSM-23, ZSM-35, ZSM-48, or a combination thereof.

9. The method of claim 1, further comprising:
    separating the hydrotreated effluent into at least a hydrotreated liquid product, a first gas-phase product, and a second gas-phase product, wherein said first and second gas-phase product comprise at least $H_2$ and $H_2S$;

providing the first gas-phase product for mixing with the hydrotreated liquid product;

recovering hydrogen from the second gas-phase product; and recycling the recovered hydrogen.

10. The method of claim 1, wherein the hydrotreated dewaxing input stream has an $H_2S$ content from about 0.5 mol % to about 10 mol % of the total gas in the hydrotreated dewaxing input stream.

11. The method of claim 1, wherein the dewaxed effluent has an aromatics content of at least about 50% of an aromatics content of the hydrotreated effluent.

12. A method for producing a dewaxed distillate product, comprising:

providing a feedstock having a cloud point of at least about 15° F. (about −4° C.), having a T95 boiling point of about 440° C. or less, and having a first aromatics content;

contacting the feedstock with a hydrotreating catalyst under effective hydrotreating conditions in a hydrotreatment reactor comprising a continuous gas phase to produce a hydrotreated effluent;

separating the hydrotreated effluent into at least a hydrotreated liquid product and a gas-phase product comprising $H_2$ and $H_2S$;

mixing the hydrotreated liquid product with a hydrogen containing stream and at least a portion of the gas-phase product to form a hydrotreated dewaxing input stream comprising an $H_2S$ content of about 0.1 mol % to 10 mol % of a total gas content in the hydrotreated dewaxing input; and contacting the hydrotreated dewaxing input stream with a dewaxing catalyst under effective catalytic dewaxing conditions in a liquid-continuous reactor to form a dewaxed effluent comprising a dewaxed distillate product having a reduced level of aromatics saturation compared to a level of aromatics saturation under otherwise identical dewaxing conditions but with $H_2S$ content below about 0.1 mol %, wherein the liquid-continuous reactor comprises a gas phase that is less than about 10% of the reactor volume, the dewaxed effluent has a second aromatics content that is at least about 50% of the first aromatics content, and the dewaxed effluent has a cloud point that is at least about 9° F. (5° C.) lower than the cloud point of the feedstock.

13. The method of claim 12, wherein the second aromatics content is at least about 65% of the first aromatics content.

14. The method of claim 12, wherein the effective catalytic dewaxing conditions include a temperature from about 500° F. (about 260° C.) to about 750° F. (about 399° C.), a total pressure from about 200 psig (about 1.4 MPag) to about 2250 psig (about 15.5 MPag), and an LHSV from about 0.2 $hr^{-1}$ to about 15 $hr^{-1}$.

15. The method of claim 12, wherein the effective hydrotreating conditions include a temperature from about 500° F. (about 260° C.) to about 800° F. (about 425° C.), a total pressure from about 200 psig (about 1.4 MPag) to about 3000 psig (about 20.7 MPag), an LHSV from about 0.2 $hr^{-1}$ to about 15 $hr^{-1}$, and a hydrogen treat gas rate from about 500 scf/bbl (about 85 $Nm^3/m^3$) to about 10000 scf/bbl (about 1700 $Nm^3/m^3$).

16. The method of claim 12, wherein the hydrotreated dewaxing input stream has an $H_2S$ content from about 0.5 mol % to about 10 mol % of the total gas in the hydrotreated dewaxing input stream.

17. The method of claim 12, wherein the dewaxing catalyst comprises ZSM-23, ZSM-48, ZSM-5, or a combination thereof.

18. The method of claim 12, further comprising:

separating the hydrotreated effluent into at least a hydrotreated liquid product, a first gas-phase product and a second gas-phase product wherein said first and second gas-phase product comprise at least $H_2$ and $H_2S$;

providing the first gas-phase product for mixing with the hydrotreated liquid product;

recovering hydrogen from the second gas-phase product; and recycling the recovered hydrogen.

19. The method of claim 12, wherein the contacting in the liquid-continuous reactor comprises:

removing at least a portion of the hydrotreated dewaxing input stream from the liquid-continuous reactor;

dissolving hydrogen in the removed portion; and passing the removed portion containing the dissolved hydrogen back into the liquid-continuous reactor.

20. The method of claim 2, wherein hydrotreated effluent has an aromatics content of at least about 10 wt %.

\* \* \* \* \*